UNITED STATES PATENT OFFICE 2,495,214

CYANOETHER ESTERS OF DIHYDRIC ALCOHOLS

Lowell T. Crews, Chicago, Ill., assignor to Armour and Company, Chicago, Ill., a corporation of Illinois No Drawing. Application June 2, 1944, Serial No. 538,533

6 Claims. (Cl. 260—404)

This invention relates to cyanoether products and more particularly to cyanoether esters of dihydric alcohols, and to processes for their preparation. These esters are useful as softeners or plasticizers for elastomers, resins, plastics and similar materials and may be used for other purposes.

In the manufacture of a synthetic plastic or elastic material it is important to incorporate along with the usual polymers or copolymers substances which will overcome any objectionable tendency toward brittleness and which will impart the desired degree of flexibility. Many factors enter into the usefulness of a substance for this purpose. For example, the substance should be compatible with the materials commonly used in the preparation of such resins, monly not discolor during processing and should have the ability to impart acid and alkali resistance.

I have discovered a series of compounds which are effective as softeners or plasticizers. These compounds have not to my knowledge been known before. They may be called cyanoether esters of dihydric alcohols. This group of compounds may be illustrated by the following general formula:

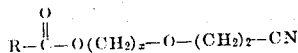

wherein R is a hydrocarbon radical having at least 8 carbon atoms and $x$ is a small whole number greater than 1. The hydrogens in the methylene group may be substituted by other organic groups.

These compounds may be prepared by reacting a β-cyanoether of a dihydric alcohol with an esterifying agent such as fatty acids, their chlorides or anhydrides.

The β-cyanoethers of dihydric alcohols have not themselves been hitherto known and the discovery of such compounds is a feature of the present invention.

The β-cyanoethers of dihydric alcohols may be prepared by reacting a dihydric alcohol with an α,β-unsaturated nitrile. The dihydric alcohol may be ethylene glycol, propane diol-1,2, propane diol-1,3, butane diol-2,3 or similar compounds. Examples of α,β-unsaturated nitriles are acrylonitrile, β-methyl acrylonitrile and crotononitrile. Preferably the reaction is carried out in the presence of a basic catalyst such as aqueous potassium hydroxide, aqueous sodium hydroxide, sodamide or sodium alcoholate. In conducting the reaction the dihydric alcohol and α,β-unsaturated nitrile are mixed and reacted under agitation in the presence of the basic catalyst. Suitably, then, the resulting product is purified to recover the β-cyanoethers substantially free of other substances.

In the preparation of the cyanoether esters of dihydric alcohols a β-cyanoether of dihydric alcohol prepared as above indicated may be reacted with an esterifying agent such as fatty acids, their chlorides or anhydrides. Where the acid chloride is used this reaction is carried out preferably in the presence of a basic catalyst such as pyridine sodium hydroxide, tertiary butylamine or aniline. The basic catalyst serves to take up the acid formed as a result of the esterification and prevent reaction of the caid at the nitrile group of the cyanoether.

This esterification reaction may preferably be carried out in a suitable solvent such as carbon tetrachloride or ether.

Following is a specific example of the preparation of β-cyanoethyl ether of ethylene glycol:

Example I

A quantity of ethylene glycol is mixed with one tenth of its weight of 40% aqueous potassium hydroxide and stirred vigorously while 80% of the calculated amount of acrylonitrile necessary for complete reaction to the monoether compound, is slowly added. The temperature of the reaction mixture is maintained at 25–30° C. during the addition of the acrylonitrile. After the acrylonitrile is added, stirring is continued for about seven hours. Then, after allowing the mixture to stand for sixteen more hours, 10% hydrochloric acid is added to neutralize. Water and unreacted components are removed by distillation at a pressure of about 15 mm. of mercury and potassium chloride is filtered from the crude product. The residue is distilled and a fraction boiling at about 140° C. at a pressure of 10 mm. of mercury is collected.

Following is a specific example of the preparation of a cyanoether ester from the product obtained by the foregoing example:

Example II

A quantity of oleoyl chloride is mixed with an equal volume of carbon tetrachloride and cooled to 0° C. in a container equipped with a mechanical stirrer and a drying tube. The solution is kept at this temperature and stirred vigorously throughout the course of the reaction. An amount of pyridine in equimolar proportion to the oleoyl chloride is added to the solution and a creamy emulsion forms. Sufficient solvent is added to make the mass fluid. Then an equimolar amount of β-cyanoethyl ether of ethylene glycol is slowly added and the mixture allowed to warm gradually to room temperature, after which stirring is continued for two or more hours. Additional solvent is added to the extent of about 100% by volume. The crystalline pyridine hydrochloride is filtered from the carbon tetrachloride solution. The resulting solution is then washed with 1% aqueous potassium carbonate until all free acid has been removed as soap. Next, the solution is washed successively with 1% hydrochloric acid, water, 1% aqueous potassium carbonate and finally with water until the washings are non-basic. The washed solution is dried over anhydrous sodium sulfate and filtered. The solvent is removed over a steam bath at a pressure of 150 mm. of mercury. The residue is heated for one hour more on the steam bath while subjected to a pressure of 5 to 10 mm. of mercury to remove traces of solvent. The product so obtained is distilled at 0.5 mm. of mercury and the fraction boiling at 236 to 243° C. is collected.

If desired, ether may be used in place of carbon tetrachloride and a dialkyl aniline in place of pyridine in the above procedure.

Various other specific procedures may be used. For example, mixtures of oleic acid and β-cyanoethyl ether of ethylene glycol are heated to 150° C. to 200° C. and the removal of water vapor facilitated by bubbling a slow stream of inert gas through the mixture. A small amount of alkali may be added as desired.

Also, I may reflux a mixture of oleic acid, β-cyanoethyl ether of ethylene glycol, benzene and a mild acid catalyst in a condenser with a drying attachment.

In the esterification procedure I may use any acid, its chloride or anhydride. Though acids of 8 or more carbon atoms may be used, I prefer to use the fatty acid esterifying agents having at least 12 carbon atoms in the hydrocarbon radical such as lauric acid, palmitic acid, oleic acid, linoleic acid and stearic acid or their corresponding chlorides or anhydrides. The acids may be saturated or unsaturated. In some instances the cyanoether esters prepared using unsaturated esterification agents are preferred because of their more favorable fluid characteristics. Suitable agents for esterification may be obtained through hydrolysis of the natural oils and fats such as the animal oils like tallow or lard, vegetable oils like soybean oil, cottonseed oil, peanut oil or linseed oil, or from fish oils like whale oil, menhaden oil, etc.

The reaction between the β-cyanoethers and the fatty acid forming the esters takes place in the hydroxyl group of the β-cyanoethers. It is therefore essential to the production of the β-cyanoether esters that the β-cyanoethers contain at least one remaining hydroxyl group. By using equal molar amounts of the dihydric alcohol and nitrile reactants, as was done in Example I, production of ether compounds having a remaining unreacted hydroxyl group is assured.

I believe that some of the desirable characteristics of my cyanoether esters are due to the presence in their molecular structure of both the fatty acid ester group and the nitrile group.

My new compounds may be incorporated into resins of the vinyl type such as the various polyvinyl resins and the resulting resinous products have the desirable qualities of flexibility and ductility. Other substances in which the cyanoether esters may be employed are synthetic elastomers such as polymerized butadiene or copolymers thereof, for example, copolymers formed from butadiene and acrylonitrile.

While in the foregoing description I have given certain modes of practice, it is understood that many modifications and changes may be made all within the spirit of the invention.

Having thus described my invention, what I claim is:

1. A cyanoether ester of a low molecular weight aliphatic dihydric alcohol and a fatty acid containing at least 12 carbon atoms.

2. A compound of the formula:

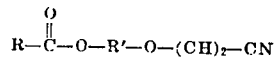

wherein R is an aliphatic hydrocarbon radical having at least 8 carbon atoms and R' is a low molecular weight aliphatic hydrocarbon group containing more than one carbon atom.

3. A cyanoethyl ether ester of a low molecular weight aliphatic dihydric alcohol and a fatty acid containing at least 18 carbon atoms.

4. A cyanoether ester as set forth in claim 3 where said hydrocarbon radical contains at least one unsaturated linkage.

5. A cyanoether ester of a low molecular weight aliphatic dihydric alcohol and oleic acid.

6. A process comprising mixing a β-cyanoether of a low molecular weight aliphatic dihydric alcohol with a fatty acid esterifying agent containing at least 8 carbon atoms to react said ether and agent to produce a cyanoether ester of said dihydric alcohol.

LOWELL T. CREWS.

REFERENCES CITED

The following references are of record in the file of this patent:

UNITED STATES PATENTS

| Number | Name | Date |
|---|---|---|
| 2,340,482 | Lycan | Feb. 1, 1944 |
| 2,352,671 | Walker | July 4, 1944 |
| 2,379,297 | Harmon et al. | June 26, 1945 |
| 2,383,137 | Lecher | Aug. 21, 1945 |
| 2,391,251 | Long | Dec. 19, 1945 |
| 2,401,607 | Bruson | June 4, 1946 |

FOREIGN PATENTS

| Number | Country | Date |
|---|---|---|
| 544,421 | Great Britain | Apr. 13, 1942 |
| 116,260 | Australia | Dec. 24, 1942 |